United States Patent Office 3,388,699
Patented June 18, 1968

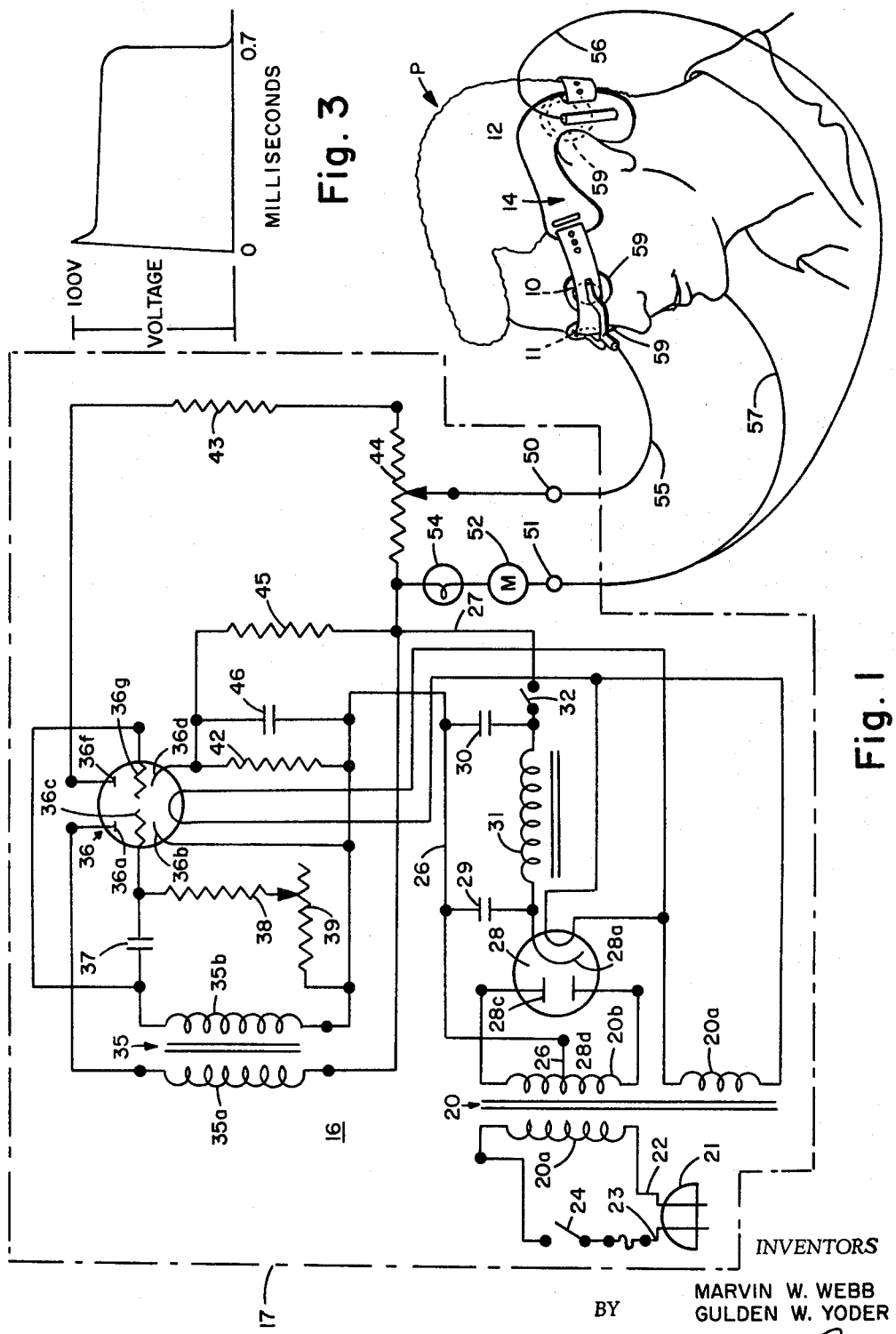
June 18, 1968  M. W. WEBB ET AL  3,388,699
METHOD AND APPARATUS FOR INDUCING LETHARGIC RELAXATION OR SLEEP
Filed Feb. 2, 1966  2 Sheets-Sheet 1
INVENTORS
MARVIN W. WEBB
GULDEN W. YODER
BY
Roy E. Raney

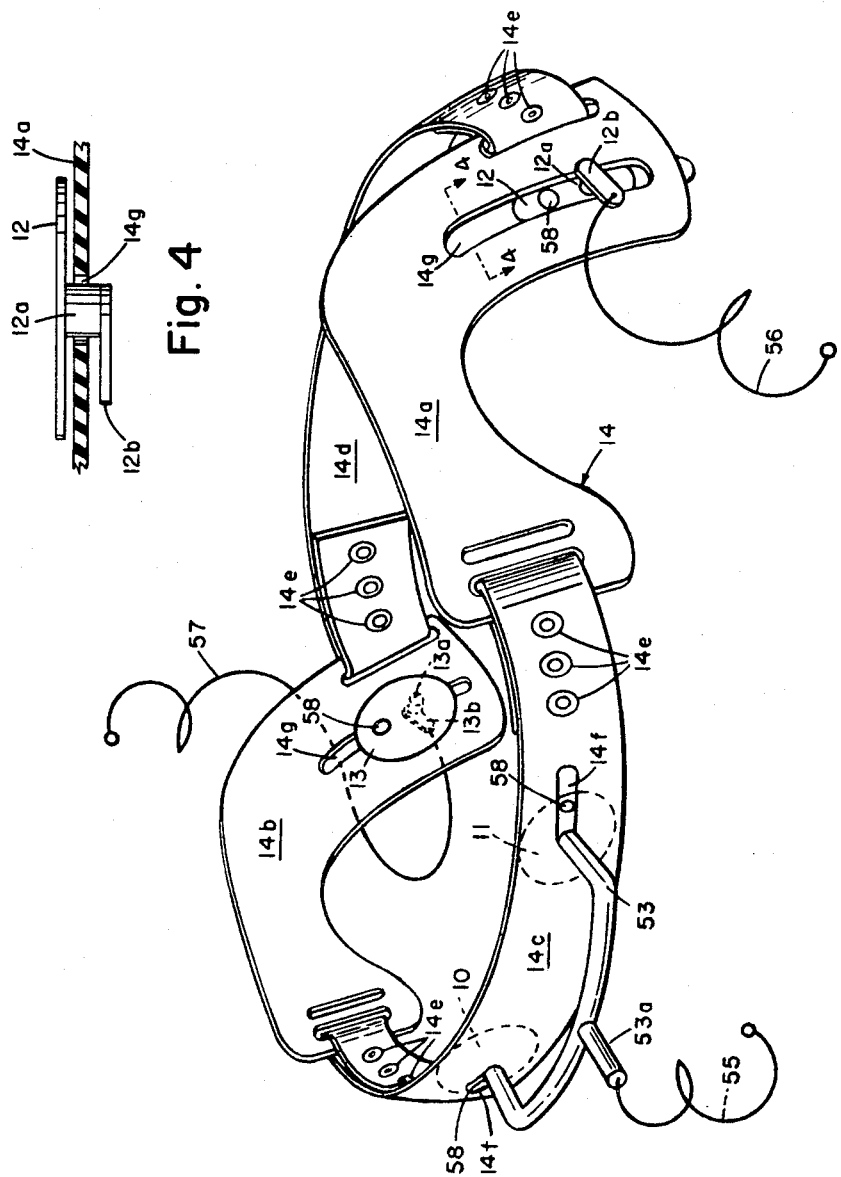

3,388,699
METHOD AND APPARATUS FOR INDUCING LETHARGIC RELAXATION OR SLEEP
Marvin W. Webb, Redington Beach, and Gulden W. Yoder, Largo, Fla., assignors to Professional Bionics, Inc., Largo, Fla.
Continuation-in-part of application Ser. No. 377,925, June 25, 1964. This application Feb. 2, 1966, Ser. No. 534,595
4 Claims. (Cl. 128—1)

The present invention relates to a method and apparatus for inducing lethargic relaxation or sleep in a person by passing a pulsating electric current to the central nervous system through the cerebrum. The present application is a continuation-in-part of application Ser. No. 377,925, filed June 25, 1964, of application Ser. No. 286,851, filed June 10, 1963, and of application Ser. No. 243,003, filed Dec. 7, 1963, all of which are now abandoned.

The principal object of the present invention is the provision of a novel method of inducing relaxation or sleep in a person which comprises applying a pulsating electrical current through the cerebrum to the central nervous system in a wave form analogous to that produced by the basic neuronal electrical discharge and at a frequency of from one to sixty pulses per second, preferably about 30 pulses per second, and having a duration of from 0.3 to 0.7 millisecond or 300 to 700 microseconds. Specifically, the current is applied to the cerebrum by electrodes placed in contact with the eyelids and the mastoid processes of the cranium so as to pass current from one electrode to the other through the cranium.

Another object of the invention is the provision of a novel apparatus adapted to apply a pulsating current at spaced locations on a human subject and which comprises a pair of electrodes, means to hold the electrodes to given areas of the body, and an electric power supply connected to the electrodes to establish a potential therebetween and in pulses in a wave form analogous to that produced by the basic neuronal discharge form and at a frequency of between one and thirty pulses per second at an amperage of between zero and one hundred microamps and at a voltage of between twenty-five and one hundred. The applied current should be in the wave form analogous to that produced by the basic neuronal discharge wave form with a duration of 0.3 to 0.7 millisecond per pulse. Means are provided for readily adjusting the frequency and current values to provide variations within the ranges of the potential and frequency mentioned. Specifically, an electrode holder maintains the cathodal electrodes in electrical contact with the eyelids and the anodal electrodes in contact with the mastoid bones of the subject's head.

Other objects and advantages of the invention will be apparent from the following description of a preferred form of the invention, reference being made to the accompanying drawings wherein:

FIG. 1 is a wiring diagram of a portion of an apparatus embodying the invention and a perspective view of a person having electrodes attached to his head for inducing relaxation or sleep;

FIG. 2 is an enlarged perspective view of the electrodes of FIG. 1 and holding means therefor;

FIG. 3 is a representation of the form of current waves generated by the apparatus;

FIGURE 4 is a view of one of the electrodes according to this invention.

Referring to the preferred form of the invention shown in the drawings, the head of a person or subject to be relaxed or made to sleep is shown at P, and pulsating current is transmitted through a part of the cranium of the subject by a set of electrodes 10, 11 applied to the eyelids and a set of disc type electrodes 12, 13 applied to the mastoid bones at opposite sides of the head. The electrodes are held in place by a holder 14, described in detail hereinafter. To induce lethargic relaxation or sleep in the subject a pulsating direct current in wave form analogous to the basic neuronal discharge wave form is passed through a portion of the central nervous system at a regular frequency of one to sixty pulses per second for a duration of 0.4 to 0.6 millisecond per pulse and the pulsating current is maintained for a period of time determined by the response of the particular subject. It is essential that the impulses be of a wave form distinct from other wave forms, the specific wave form being illustrated at FIG. 3 in which the voltage increases instantaneously from zero to from 25 to 100 volts and 0–100 microamps average meter reading, for example, and rapidly decays about 10% which forms a "peak" on the wave, as seen in FIG. 3, and until a decay of 5% occurs for a substantial portion of the wave, which may be from slightly less than .3 to .7 millisecond at which time the voltage drops rapidly to zero, and the drop is almost instantaneous from about 85% of the maximum. This wave form corresponds to that produced by the basic single neuron discharge of all nerve cells and it is believed that the application of current in this wave form stimulates the neurons most effectively. The operating current intensity should be just below the threshold of pain to the particular subject and the frequency of pulses is adjusted to the need of the particular subject undergoing treatment, but within the ranges mentioned. Usually the best frequency is from eight to thirteen pulses per second.

Current potential is applied to the electrode sets 10, 11 and 12, 13 by pulse generator 16, which may be suitably housed in a cabinet indicated schematically at 17 and comprises DC current source, a pulse generator and an amplifier described in detail hereinafter.

The DC current source includes a step-up transformer 20 having primary and secondary coils 20a and 20b arranged to increase voltage from approximately 115 volts sixty cycles per second AC to 500 volts sixty cycles per second AC. The primary winding is energized from a conventional plug-in type of 115 volts AC current domestic power outlet (not shown) through a plug 21 having its terminals connected with opposite sides of the primary coil by wire 22 and 23, the latter having a manual on-off switch 24 interposed therein. The output of the DC power source comprises wires 26 and 27, the wire 26 forming a centertap of secondary coil 20b and wire 27 being connected to the cathode 28a of a full wave rectifier tube 28. A smoothing filter network comprising two 10 microfarad condensers 29 and 30 parallel connected between wires 26 and 27 and a 100 milliamp choke coil 31 interposed in wire 27 between the terminals of the condensers as shown provides a DC output through plates 28c and 28d which are connected to the respective ends of the secondary coil. The rectifier tube is preferably type 6X4 and the output voltage is about 350 volts and the filament of the tube is energized by a low voltage secondary coil 20c of transformer 20. Preferably an on-off switch 32 is in output 27 to permit disconnection of the power output from the oscillator circuit without cooling off tube 28. The foregoing power source is conventional and any other suitable source could be employed.

The output of the power supply section is connected to a suitable pulse generator which in the present embodiment is a blocking oscillator comprising a pulse transformer 35 having a primary coil 35a and secondary coil 35b which are of a one to one ratio. One terminal of the primary coil is attached to wire 27 and the other is connected with a plate 36a of a twin triode amplifier tube 36, which in the present instance is type 6CS7. The cathode 36b of tube 36 is connected with output wire 26 and also with an oscillator network including secondary 35b, as shown. The oscillator network includes a condenser 37 connected to the grid 36c and secondary 35b. A resistor 38 and a variable resistor 39 in series is connected from DC output 26 to the grid 36c of tube 36, as shown. The filament of tube 36 is connected with secondary coil 20c for its power source. Preferably, tube 36 is type 6CS7 and condenser 37 is a 0.1 microfarad and resistor 38 is a 300K ohms. The values of the condenser 37 and resistor 38 will provide a conducting phase of from 0.3 millisecond to 0.7 millisecond. Variable resistor 39 has a value of 5 megohms. By varying resistor 39 the oscillation per second can be regulated between 1 to 60 cycles per second, although about 30 cycles per second has been found to be most effective.

The blocking oscillator is connected to an amplifying circuit which includes the cathode 36d which is connected with output 26 of the DC power supply through a resistor 42 and condenser 46 in parallel. The resistor 45 is connected between grid 36d and DC output 27. Plate 36f is connected to the DC output 27 by a circuit including resistor 43, and variable resistor 44. The values of resistors 42, 43, 44 and 45 are 5K, 2K, 3K, and 20K respectively, and the value of the condenser is 10 mf. Grid 36g is connected between coil 35b and condenser 37 to provide a feed-back.

The output terminal 50 of the amplifier is connected to the wiper contact of variable resistor 44 and the terminal 51 is connected to the DC output circuit 27 with meter 52, as shown. Preferably, a one hundred microamp meter 52 is connected in series with terminal 51 and a neon lamp 54 is in series with the meter. The meter permits the operator to read the current output and the neon lamp gives a visual indication of the frequency and comparative intensity of the current by the steadiness of the light emitted by the lamp as well as its relative intensity. The light will appear to flicker at approximately from one to fifteen cycles per second. Electrodes 10, 11 are connected with the terminal 50, which is negative, and electrodes 12, 13 are connected with terminal 51, which is positive.

Referring now particularly to FIG. 2, the electrode holder 14 comprises two generally L-shaped, flat, relatively rigid plastic members 14a and 14b which are interconnected by adjustable flexible straps or bands 14c and 14d. The ends of strap 14d are extended through slots adjacent the ends of members 14a and 14b and are folded back on the strap and secured in place by snap type fasteners 14e, a series of which are provided along the strap by which the end portions of the strap can be variably attached so as to adjust the length of the band fit onto the heads of different subjects. Two spaced stainless steel electrodes 10 and 11 are attached to the central portion of strap 14c, and are preferably interconnected by a yoke bar 53 having the ends thereof suitably attached to the center of the discs. A terminal post 53a is provided on the yoke to which a wire 55 is attached and discs 10 and 11 can be located on the inside thereof as shown so as to be held to the surfaces of the eyelids.

Electrode discs 12, 13 are likewise surface electrodes and each is held in contact to the mastoid process. Wires 56, 57 are connected to the anode electrodes and to terminal 51. Ringers solution is applied to a pad disposed between the electrode and the subject's skin, as described hereinafter.

Owing to the low intensity of the electric current placement of the electrodes is crucial. The eyelid and mastoid positions are utilized for two reasons: (1) the optic foramen and mastoid process provide the least resistance from cranial bone and the least tactile dissipation of current; (2) the optic tract provides the most accessible conductor route to the vegetative nervous sytsem whose activity is significantly dampened by the current.

As viewed in the drawings, members 14a and 14b each have vertically extending slots 14g formed therein through which posts 12b and 13b extend so that the electrodes 12 and 13 can be adjustably positioned after the holder 14 is secured to the subject's head. The holder is placed on the head of the subject with band 14c across the eyes and band 14d across the back of the head so that one lead of each of the members 14a and 14b projects forwardly alongside the temple and the other leg projects downwardly on the mastoid process in back of the ears.

In use, the subject is placed in a reclining or sitting position and the electrodes attached to his head. Cloth pads 59 are thoroughly wetted with a saline or Ringers solution and interposed between the electrode discs and the subject's skin to provide good electrical contact and each disc is provided with the openings 58 therethrough which fresh solution may be added to the pads from time to time. The openings 58 are aligned with the slots 14f and 14g in band 14c and members 14a and 14b, respectively, as shown. Switch 24 is closed (assuming plug 21 to be connected with a 115 volt AC power source) and the device allowed to warm up. Switch 32 is then closed and a potential is established between the sets of electrodes 10, 11 and 12, 13. Variable resistor 44 is then adjusted to produce a current just below the threshold of pain to the subject. The voltage which produces this threshold of pain will depend upon the particular subject and will vary from person to person. Resistor 39 is then adjusted to produce a frequency which is most efficacious for the individual subject. The meter 52 indicates current strength. In a matter of minutes the brain becomes fatigued by this stimuli and there occurs a protective inhibitory reaction within the neutrons involved, progressively diffusing in breadth and depth. This progressively diffused cerebral inhibition results in lethargic relation ultimately proceeding to sleep. As the process of inhibition proceeds, the factor of critical judgment diminishes in pari passu and the subject reaches a state of hypersuggestability in which he becomes especially responsive to endogenous or exogenous suggestions. Upon subsequent waking, the subject will have a feeling of refreshment and general well-being and mild exhilaration. Repeated usage of the method and apparatus conditions a subject so that the duration of application of the current can be diminished without impairing the efficacy of the treatment.

The method and apparatus of the invention are particularly useful and beneficial to nervous persons who have difficulty in sleeping and the invention may also be employed to effect certain psychiatiric treatment. It may also be employed to condition new sleep cycles for whatever purpose.

It will be understood that although but one form of the invention has been shown, other forms, modifications, and adaptations could be employed, all falling within the scope of the claims which follow.

Having described our invention, we claim:

1. In a device for inducing lethargic relaxation or sleep in a subject wherein electrical impulses are generated by electrical means and applied to the subject's cerebrum by electrodes attached in near contact with the subject's eyelids and mastoid processes, the improvement in said electrical means, comprising means for generating voltages which, in a predetermined period of time, said predetermined period of time being in the range of 0.3 to 0.7 millisecond, increase substantially instantaneously from a reference level to a maximum magnitude, said maximum magnitude being in the range of 25 to 100 volts, in a small portion of said period of time change to a magnitude intermediate the maximum and reference levels, in substantially the remaining portion of said period of time change to a magnitude between said intermediate and refrence levels and then substantially instantaneously return to said reference level.

2. The improvement defined in claim 1 wherein said magnitude intermediate the maximum and reference levels is substantially 90% the maximum magnitude and wherein said magnitude between said intermediate and reference levels is substantially 85% of said maximum.

3. In a method of inducing lethargic relaxation or sleep in a subject comprising the application of electrical impulses to the subject's cerebrum, the improvement comprising, in a predetermined period of time, said predetermined period of time being in the range of 0.3 to 0.7 millisecond, applying to said subject an electrical impulse:

increasing said impulse from a reference level to a maximum magnitude substantially instantaneously, said maximum magnitude being in the range of 25 to 100 volts, in a portion of time less than half of said period of time change said impulse to a magnitude intermediate said reference and maximum levels, in substantially the remaining portion of said period of time change said impulse to a magnitude between said reference and intermediate levels, substantially instantaneously return said impulse to said reference level, and then repeat application of such electrical impulses to the subject.

4. The method defined in claim 3 wherein said change of said impulse to an intermediate magnitude is changed to a magnitude of substantially 90% the maximum magnitude and said change of said impulse to a magnitude between said reference and intermediate levels is a change to substantially 85% of said maximum magnitude.

References Cited

UNITED STATES PATENTS 3,160,159 12/1964 Hoody et al. _____ 128—1.03
3,219,028 11/1965 Giordano _____ 128—1.03

FOREIGN PATENTS 1,177,325 12/1958 France.

OTHER REFERENCES

Buchsbaum: "Electronic Anesthesia;" Electronics World, September 1963, pp. 27–29.

RICHARD A. GAUDET, *Primary Examiner.*

S. BRODER, *Examiner.*